United States Patent [19]
Loomis

[11] 3,791,311
[45] Feb. 12, 1974

[54] PNEUMATIC SAFETY SYSTEM FOR VEHICLE LADING

[75] Inventor: Russell M. Loomis, Palos Heights, Ill.

[73] Assignee: Unarco Industries, Inc., Chicago, Ill.

[22] Filed: Oct. 28, 1971

[21] Appl. No.: 193,384

[52] U.S. Cl............................ 105/369 BA, 105/376
[51] Int. Cl.......................... B60p 7/14, B61d 45/00
[58] Field of Search 105/369 BA, 369 D, 369 S, 376; 214/10.5 BA

[56] References Cited
UNITED STATES PATENTS

| | | | |
|---|---|---|---|
| 3,673,968 | 7/1972 | Bertram......................... | 105/369 BA |
| 3,427,997 | 2/1969 | Brown, Jr. et al............. | 105/369 BA |
| 3,499,395 | 3/1970 | Val Verde...................... | 105/369 D |
| 3,593,674 | 7/1971 | Winterfeldt.................... | 105/376 |
| 3,168,055 | 2/1965 | Vander Hyde et al. ......... | 105/376 |
| 3,559,591 | 2/1971 | Breen............................. | 105/369 D |

Primary Examiner—Drayton E. Hoffman

[57] ABSTRACT

A pneumatic force-absorbing bulkhead system for use in freight carrying vehicles is provided by a load-absorbing bulkhead suspended from an overhead transport carriage with the bulkhead supporting therefrom a lading-engaging panel with inflatable envelope means carried by the bulkhead and disposed between the bulkhead and panel. Y-shaped linkages provide a simplified support and expanding linkage between the bulkhead and panel, and in one preferred form the linkage connects adjacent the upper edge of the panel and to the bulkhead to provide means for maintaining the upper edge of the panel substantially within a horizontal plane as the panel moves toward and away from the bulkhead while permitting the panel to pitch relative to a vertical plane, through the pivot connection of the linkage to the panel, to permit the panel to conform to the side of the lading being engaged by the panel.

14 Claims, 5 Drawing Figures

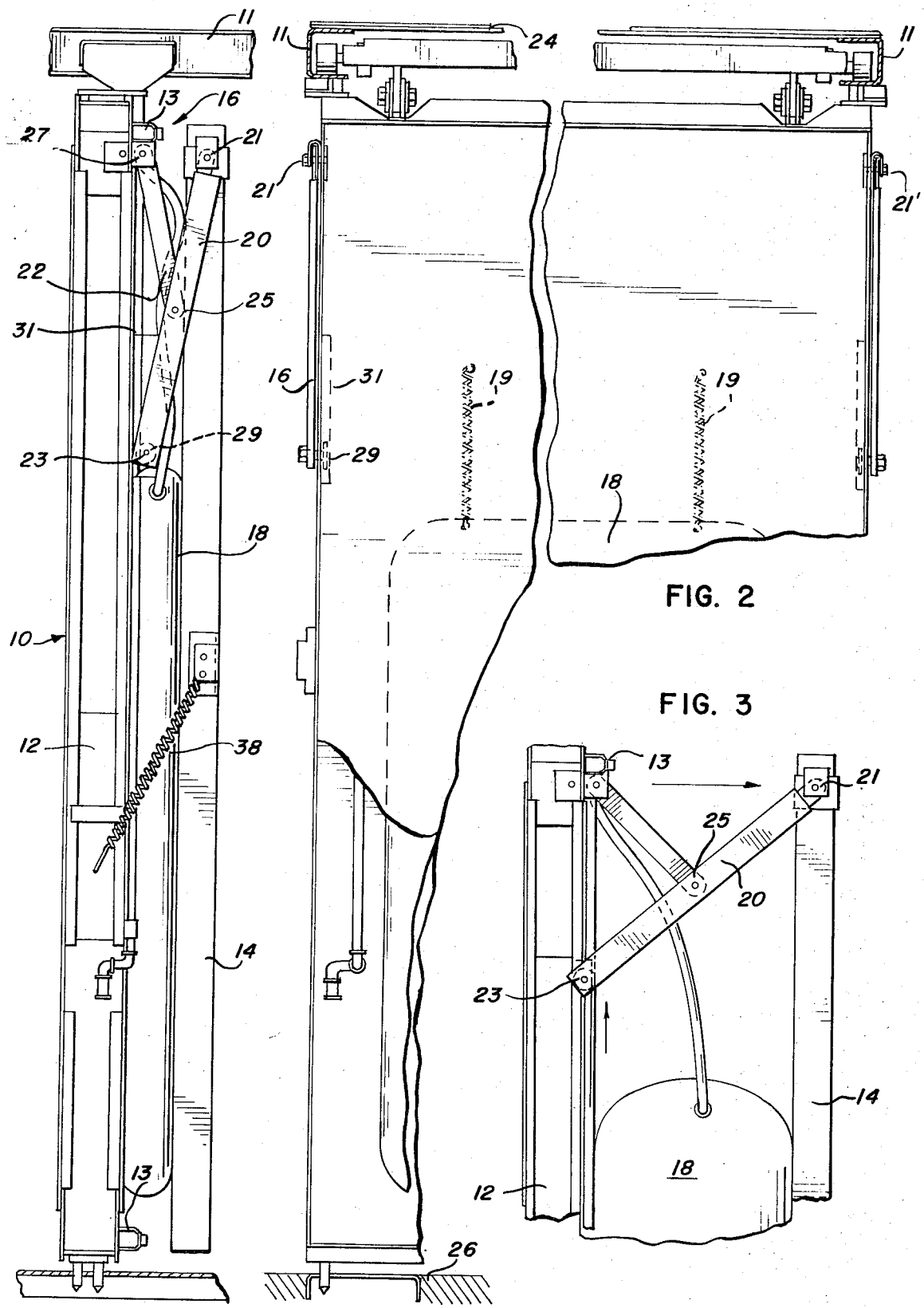

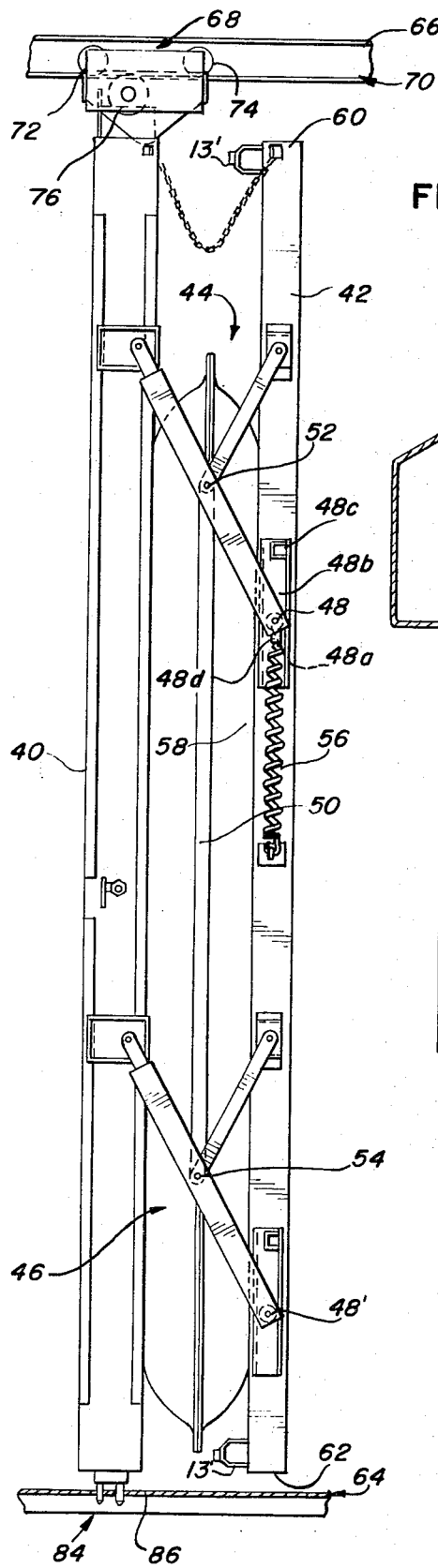
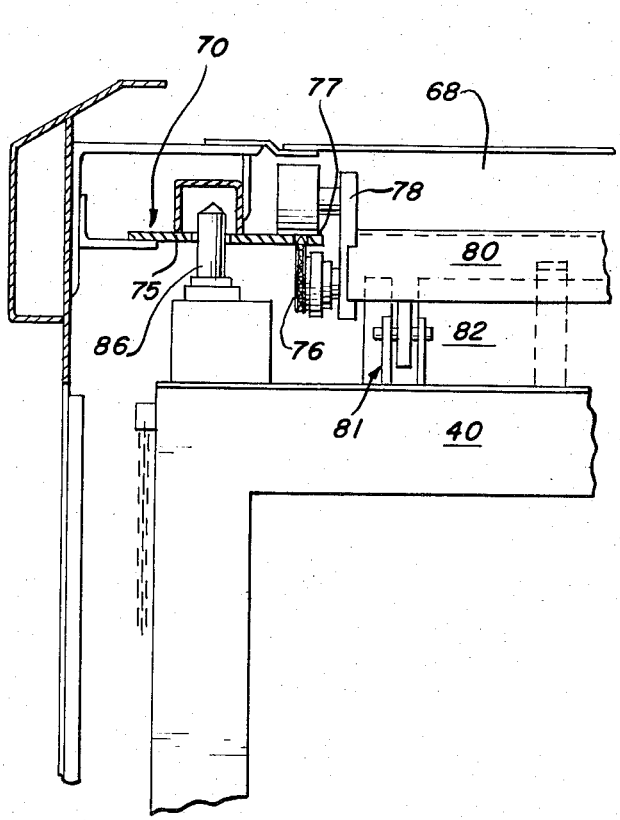
FIG. 4
FIG. 5

3,791,311

PNEUMATIC SAFETY SYSTEM FOR VEHICLE LADING

BACKGROUND OF THE INVENTION

This invention relates to systems for cushioning the movement of lading within a lading-carrying vehicle and in particular is directed to linkages and suspensions for use with cushioning systems employing inflatable envelopes.

Pneumatic force-absorbing bulkhead systems for use in freight carrying vehicles are known in the prior art. Where both bulkheads and lading-engaging panels have been used, as in U.S. Pat. No. 3,427,997, the supports for the bulkheads and panels have been complex, and additionally the panels are restrained from pitching relative to the vertical to conform to a side of lading that is not precisely vertical. U.S Pat. No. 3,673,968, issued July 4, 1972, to the assignee of this application, discloses a pneumatic force-absorbing bulkhead system wherein the panel is supported solely from the bulkhead or wall-type member in a manner permitting the panel to conform by pivoting and/or skewing to the abutting side of lading.

It is one object of this invention to provide an improved and simplified support and expanding linkage connection between the bulkhead and the lading-engaging panel of a pneumatic force-absorbing bulkhead system.

It is another object of this invention to provide an improved pneumatic force-absorbing bulkhead system wherein the upper edge of the lading-engaging panel is maintained substantially in a horizontal plane as the panel moves relative to the bulkhead, but at the same time permitting the panel to pitch relative to a vertical plane to permit the panel to substantially conform to the side of the lading engaged by the panel.

And it is a further object of this invention to provide a pneumatic force-absorbing bulkhead system that is characterized by simplicity and inexpensiveness of construction and by effectiveness and efficiency of operation.

SUMMARY OF THE INVENTION

There is provided by one form of this invention a pneumatic lading-cushioning system which includes a Y-shaped linkage for attaching an upper portion of the panel to a wall-type member or bulkhead to support the panel by the bulkhead and to permit the panel to move toward or away from the wall-type member in a manner such that the top edge of the panel moves in a plane substantially parallel to the floor or ceiling of the lading-carrying vehicle, while the panel is free to pivot or pitch relative to a vertical plane. When the cushioning system is in the form of a movable bulkhead, an overhead carriage is provided for suspending the bulkhead and its attachments from overhead track means mounted to the vehicle adjacent the ceiling thereof.

In another form of the invention, linkages identical with those used to attach the upper portions of the bulkhead and panel can be used to attach the lower portions of the bulkhead and panel such that the panel is simply but effectively supported by the bulkhead and the panel is constrained from pivoting or pitching and at all times is maintained parallel to the wall-type member as the panel moves toward and away from the bulkhead.

BRIEF DESCRIPTION OF THE DRAWINGS

FIG. 1 is a side elevational view of a bulkhead for cushioning lading which includes Y-shaped linkages secured to the upper portions thereof for permitting movement of the panel toward and away from the wall-type member;

FIG. 2 is a front elevational view partially in section and partially fragmented depicting the novel carriage arrangement;

FIG. 3 is a partially fragmented side elevational view depicting the linkages in an extended position when the envelope is inflated;

FIG. 4 is a side elevational view of a cushioning system having both upper and lower linkages for connecting the upper and lower portions of the wall-type member and the panel to each other; and FIG. 5 is an enlarged view of the carriage for supporting the bulkhead in its movement in the car.

DESCRIPTION OF THE PREFERRED EMBODIMENT

A cushioning bulkhead system 10 generally, is shown in FIGS. 1 and 2 which is movable within a vehicle, such as a railway car, longitudinally in the direction of the vehicle. It will be appreciated that the linkage arrangement described hereinafter can be useful in either a movable bulkhead or in connection with an end-wall cushioning arrangement.

The bulkhead cushioning system is suspended from a pair of overhead tracks 11 and includes an upright wall-type member 12 which extends across almost the entire height and width of the interior of the lading-carrying vehicle. An upright lading-engaging panel 14 is secured to the wall-type member 12 by means of a Y-shaped linkage 16, generally. An inflatable envelope 18 is hung by the springs 19 from the wall-type member 12 and engages both the wall-type member and the panel 14.

In the preferred embodiment of FIGS. 1 and 2, where the panel is permitted to pitch relative to a vertical plane, the linkage system 16 includes a long arm 20 which is pivotally connected at one end 21 adjacent an uppermost portion of the panel 14, substantially adjacent the uppermost edge of panel 14. The other end 23 of the arm 20 is pivotally and slidably connected to the wall-type member 12 by means of a roller 29 which moves in an open-sided channel shaped track 31 mounted to the wall-type member. Reference should also be had to FIG. 3 where it can be seen that the sliding end 23 of the arm 20 is adapted to move vertically with respect to the wall-type member 12. A short arm 22 is pivotally connected at its lower end 25 to the long arm 20 at its midpoint while the upper end 27 is pivotally connected to the wall-type member 12. The effective length of the long arm (i.e., the distance between its end pivotal connections) is twice the effective length of the short arm 22. An identical set of linkages is provided on each side edge of the bulkhead cushioning system as shown in FIG. 2.

After the lading has been appropriately positioned in the vehicle, the bulkhead is moved to a position adjacent the lading and the envelope 18 is inflated as shown in FIG. 3. As the envelope expands, it pushes the panel 14 away from the wall-type member 12. The movement of the panel 14 causes the linkages to move in a manner such that the joint pivot 25 of the two arms moves upwardly and away from the wall-type panel. The sliding end 23 of the long arm 20 is a lost motion connection which moves upwardly in a substantially vertical plane. The movement of the end 21 of the long arm 20 is substantially horizontal and the movement of the upper edge of the panel adjacent the pivoted connection is also substantially horizontal. Thus, this linkage arrangement permits the movement of the panel in a manner such that its top edge moves in a substantially horizontal plane, or parallel to the ceiling 24 and floor 26. Coiled tension springs 38, secured to wall 12 and panel 14 at each edge of wall 12, bias panel 14 toward wall 12 tending to deflate the envelope 18. Upper and lower bumpers, or spacers 13 on wall 12 serve as abutments that space panel 14 from wall 12 to prevent damage to the envelope.

As seen in FIG. 1, the panel 14 in a sense hangs below the pivotal connections 21 adjacent the upper edge of the panel. Since the panel is supported only by a pair of aligned linkages, the panel 14 is free to pitch relative to a vertical plane through axis 21-21' defined by those two pivoted connections to permit panel 14 to accommodate itself to the adjacent side of stacked layers of lading within the lading-carrying vehicle. In other forms where such pitching by the panel is not required, the Y-linkages may be multiplied and relocated below the upper edge of the panel.

In a geometric sense the arms 20 and 22 form a pair of isosceles triangles defined by the various pivotal connections. The pivotal connection 27 between the wall and short arm and the long arm pivotal connections 25 and 21 define an isosceles triangle (25-21-27). The imaginary base (21-27) lies in a plane at right angles to the wall-type member and its length corresponds to the distance between the wall and the panel. The second isosceles triangle (23-25-27) is defined by the pivotal connection 27 between the short arm and the wall, the connection 25 of the two arms and the slider connection 23 between the wall and the long arm. It is seen that both isosceles triangles have a common apex defined by the pivotal interconnection 25 of the two arms. When the panel is moved away from the wall, the length of the base 21-27 increases in length; whereas, when the panel is moved toward the wall, the length of the base decreases.

In the embodiment shown in FIGS. 1 and 3, the linkage system 16 is connected to the wall at two points and the panel at a single point. This positioning can be reversed such that the pivotal connection at 21 could be made to the wall while the pivotal connection 27 and slider connection 23 is made to the lading-engaging panel 14. Other various arrangements could be made, but the arrangements shown in FIGS. 1 and 3 depict a preferred embodiment in which the panel 14 is capable of providing the maximum amount of swinging or pivoting to accommodate the various stacked layers of lading.

Referring now to FIG. 4, a double linkage system is shown for use in a bulkhead cushioning system. The spacers 13' that limit movement of the panel toward the bulkhead are shown carried on the panel. The wall-type support member 40 carries the lading-engaging panel 42 by means of upper and lower linkage connections 44 and 46. The linkage connections operate in principle in precisely the same manner as the linkage 16 previously described. However, in this system the connections have been reversed so that: (a) the slider connections 48 and 48' cooperate with the panel, (b) the short arm pivotal connections are to the panel, and (c) the long arm pivotal connections are to the wall-type member. The slider connection 48 includes a roller 48a which is arranged to roll in a channel-like track 48b recessed in the side edge of the panel 42. An upper stop member 48c limits the vertical movement of the roller 48a. A small connection link 48d is mounted to the slider connection at one end and at the other end to the tension spring 56 which in turn is mounted to the panel 42.

Aside from these differences, the linkages themselves are substantially identical and by virtue of their being upper and lower linkages the panel 42 is prohibited from rotating or pivoting about any axis. In order to assure uniform movement of the panel with respect to the wall, a linkage connection arm 50 is pivotally connected at 52 and 54 to the pivotal connections between the short arm and the long arm of both sets of linkages 44 and 46.

In the embodiment shown in FIG. 4, the tension spring 56 is mounted to the panel and the upper slider 48 so as to pull the slider in a downward direction and thereby urge the panel 42 in a direction toward the wall-type member. Thus, when the envelope 58 is deflated, the spring 56 by its action on the linkage 44 urges the panel 42 into a closed position adjacent the wall-type member 40. The use of the upper and lower linkages 44 and 46 maintains the lading-engaging panel 42 parallel to the wall-type member 40 as the panel moves toward and away from the wall-type member and also assures the movement of the top and bottom panel edges 60 and 62 in planes at right angles to the wall-type member 40 or substantially parallel to the floor 64 or ceiling 66 of the vehicle. The spring and linkage arrangement can be reversed if it is so desired, but the arrangement just described is preferred.

In both the upper linkage arrangement as in FIGS. 1 and 3 and the upper and lower linkage arrangement in FIG. 4, the slidable end of the long arm must be maintained in engagement with the wall or panel as the case may be. This is accomplished by applying a torque about the pivotal connection of the short arm and long arm which torque urges the slidable end of said long arm into engagement with the wall or panel.

As previously indicated, the single or double linkage arrangement can be used in combination with a fixed wall-type member, such as an end wall of the railway car, or with the wall-type member of a movable bulkhead cushioning system. In either case, the linkage arrangement and spring arrangements would be described herein before.

In the bulkhead system, a carriage arrangement is provided for supporting and moving the bulkhead along a pair of overhead tracks for the length of the car. In FIGS. 4 and 5, the left-hand side of the system is shown, but it is understood that the right-hand side is symmetrical thereto. The carriage 68 carries the entire bulkhead through a mounting only to the wall-type member. Since the bulkhead is only mounted to the carriage at the wall-type member, the forces may cause the bulkhead to rotate about the connection and in order to accommodate that rotation, the carriage center line and the wall-type member center line are offset with respect to one another.

The carriage 68 rides on an overhead track system 70 which is mounted to the lading-carrying vehicle adjacent the ceiling thereof and which extends longitudinally of the vehicle. The carriage includes a pair of support rollers 72 and 74 mounted to roll on a flat perforated track 75. A driving gear 76 whose center is aligned with the center of the wall-type member is disposed beneath the track and arranged to engage a series of drive apertures 77 provided therein. Thus it will be appreciated that by driving the gear 76 the carriage and the bulkhead can be moved along the track 75.

The rollers and gear are mounted for rotation in an appropriate journal block 78. The left journal block 78 and right-hand journal block (not shown) are connected by means of a laterally extending channel 80. A laterally extending upright plate 82 is mounted to the wall-type member 40 such that a pivoting clevis-like connection 81 can be provided between the channel 80 and wall type member 40. The rollers are arranged such that when the envelope 58 is deflated, the outer surfaces of the bulkhead are substantially in line with the roller centers. The clevis connection is positioned midway between the roller centers and offset with respect to the center of the wall. Thus in the deflated condition the weight of the bulkhead is substantially equally divided between the rollers 72 and 74. If the lading-engaging panel 42 is moved away from the wall 40, a torque is created which causes the bulkhead to pivot about the clevis connection but this does not change the downward loading on the clevis and the rollers. By virtue of this design, the driving gear 76 carries little, if any, of the weight of the bulkhead and is thus loaded only during movement of the bulkhead.

The bulkhead is locked in position in the vehicle by means of wall mounted latch pins 84 and 86 which engage the tracks 88 and 75 provided in the floor and ceiling of the car. It is understood that these are locking latch pins as described in the prior art and when locked in position, fix the bulkhead assembly position in the car.

In one manner of use, the vehicle is loaded with lading and the bulkhead with the envelope deflated is moved adjacent the end of the lading by driving the gears 76 in the known manner. The bulkhead is then positioned, the latch pins engaged and the envelope inflated so as to cause the panel to tightly engage the lading. During shipment movement of the lading against the panel is cushioned by the inflated envelope. The forces not absorbed by the envelope are transmitted to the wall-type member which in turn transmits the forces to the frame of the vehicle through the locking tracks.

It will be appreciated that numerous changes and modifications can be made to the embodiment disclosed herein without departing from the spirit and scope of this invention.

What I claim and desire to secure by Letters Patent of the United States is:

1. In a load-cushioning system, for freight-carrying vehicles, of the type wherein a wall-type member and a load-engaging panel spaced by an inflatable envelope therebetween are interconnected so that the spacing of the member and panel may be controlled by inflation of the envelope, the improvement comprising, in combination: linkage means and spring means positioned laterally outwardly of the panel and envelope but adjacent to both lateral edges of the panel for controlling movement of each edge of the panel independently toward and away from the wall-like member, each linkage means including an independently operable Y-shaped linkage having portions positioned laterally outwardly of but adjacent the lateral edge of the panel for connecting said panel to said wall-type member, each linkage comprising, a short arm, and a long arm twice the effective length of the short arm with the short arm pivoted to the long arm at the midpoint of the long arm, the other end of the short arm being pivoted directly to one of the pair of the wall-type member and the panel, the long arm having one end pivoted directly to the other of said pair and its other end carrying a member that cooperates with an elongated track on the one of said pair to which the short arm pivotally connects, and the spring means being operatively secured to at least one of said pair and normally biasing said pair of panel and wall-type member in a direction toward each other.

2. A device as in claim 1 wherein the member carried on the other end of the long arm of the linkage is a roller, and the elongated track is an elongated recess bounded along opposite edges and is provided at the upright edge of the one of said pair of wall-type member and panel.

3. A device as in claim 1 wherein the pivot connection between the panel and the Y-shaped linkages permits pivoting of the panel thereat to positions angled with respect to the wall-type member, and spring means operatively associated with the panel and wall-type member normalling biasing the panel about its pivot and toward the wall-type member.

4. A device as in claim 1 wherein the spring means is an elongated coil spring attached at one end to the panel and at its other end to the wall-type member.

5. A device as in claim 1 wherein the plurality of Y-shaped linkages interconnect only the wall-type member and the uppermost portion of the panel, thereby permitting the panel to incline relative to the upright attitude of the wall-type member.

6. A device as in claim 5 wherein the elongated track is on the wall-type member, and the spring means includes an elongated coil spring secured at one end to the panel and at its other end to the wall-type member at a point spaced below the securement of the one end of the spring to the panel.

7. A device as in claim 1 wherein the spring means is carried on only one of said pair of wall-type member and panel and is operatively associated with the other of said pair by connection to the linkage means.

8. A device as in claim 2 wherein the spring means interconnects between the linkage and the one of the pair, of wall-type member and panel, that is provided with the elongated track.

9. A device as in claim 1 wherein two vertically-spaced sets of Y-shaped linkages are provided adjacent each edge of the panel for securing the panel to the wall-type member, and spring means are carried on the panel and cooperate with the uppermost ones of the vertically-spaced sets of linkages.

10. A device as in claim 9 wherein the sets of vertically-spaced Y-shaped linkages adjacent an edge of the panel are interconnected by members in addition to the panel and wall-type member.

11. In a load cushioning system, for freight-carrying vehicles, of the type wherein a track-supported wall-type member and a substantially upright load-engaging panel are spaced by inflatable envelope means, the panel being supported through arm means, solely from the wall-type member, and the panel's attitude being determined in part by both the arm means and the inflatable envelope means; the improvement comprising, in combination: said arm means providing similar linkages independently connecting to the panel adjacent both upright edges of the panel, the linkages adjacent each upright edge of the panel being independently operable and each including a long arm extending between and operatively connected at its ends to the panel and the wall-type member, and a short arm pivotally connected at one end thereof to a junction point on the long arm substantially at mid-length of the long arm and pivotally connected at its other end to one of the pair of panel and wall-type member, and the operative connection at one end of the long arm providing for relative movement between the long arm and the one of the pair of panel and wall-type member, said relative movement being effected through a member carried at one end of the long arm and being slidably positioned in an elongated track that is provided at the edge of one of said pair of panel and wall-type member.

12. A device as in claim 11 wherein the member that is positioned in the elongated track is a roller.

13. A device as in claim 11 wherein two similar vertically-spaced linkages are provided at each edge of the panel and are joined through the junction points to operate in unison.

14. A device as in claim 11 including spring means normally biasing the panel toward the wall-type member, the spring means being operatively connected to the linkage means to bias said member in a direction tending to move same along the elongated track.

* * * * *